United States Patent [19]
McKnight et al.

[11] 4,036,071
[45] July 19, 1977

[54] SPROCKET AND METHOD FOR PRODUCING SAME

[75] Inventors: Oliver R. McKnight, Bossier City; William M. Seaman, Jr., Shreveport, both of La.

[73] Assignee: Hollis and Company, Caddo, La.

[21] Appl. No.: 673,284

[22] Filed: Apr. 2, 1976

[51] Int. Cl.² .............. F16H 55/30; F16H 55/06; B21D 53/26; B21K 1/28
[52] U.S. Cl. .............. 74/243 R; 29/159 R; 74/462
[58] Field of Search .............. 74/462, 457, 243 R; 29/159 R, 159.2

[56] References Cited
U.S. PATENT DOCUMENTS 3,448,629  6/1969  Pfrank et al. .............. 74/243 R Primary Examiner—Leonard H. Gerin
Attorney, Agent, or Firm—John M. Harrison

[57] ABSTRACT

A sprocket designed to drive chains in power transmission systems, which is characterized by a tooth profile having clearance, loading, and topping curves tailored to a selected chain barrel diameter and chain pitch, a selected pressure angle compatible with minimum stress on each engaged tooth of the sprocket, and a continuously curving tooth profile also contributing to the minimizing of stresses.

5 Claims, 8 Drawing Figures

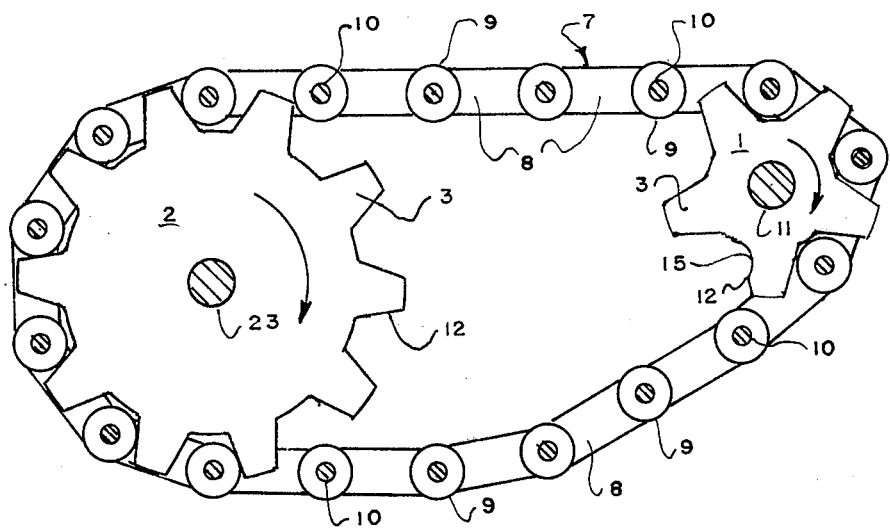
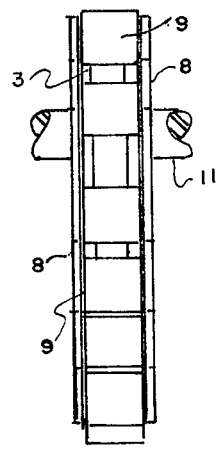
FIG. 1  FIG. 2
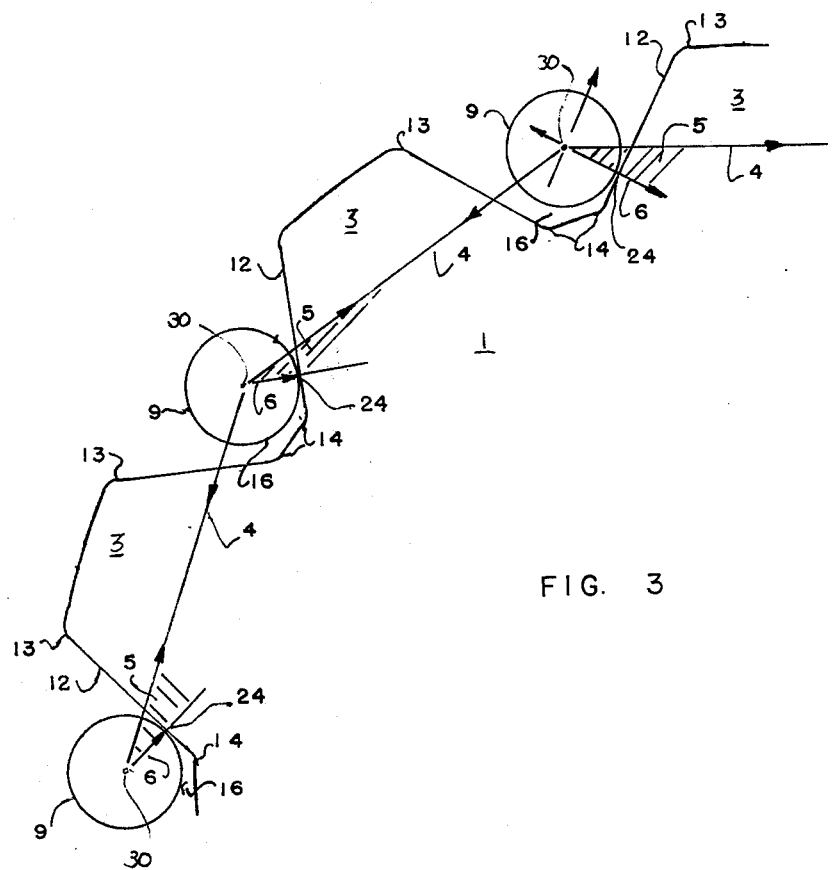
FIG. 3

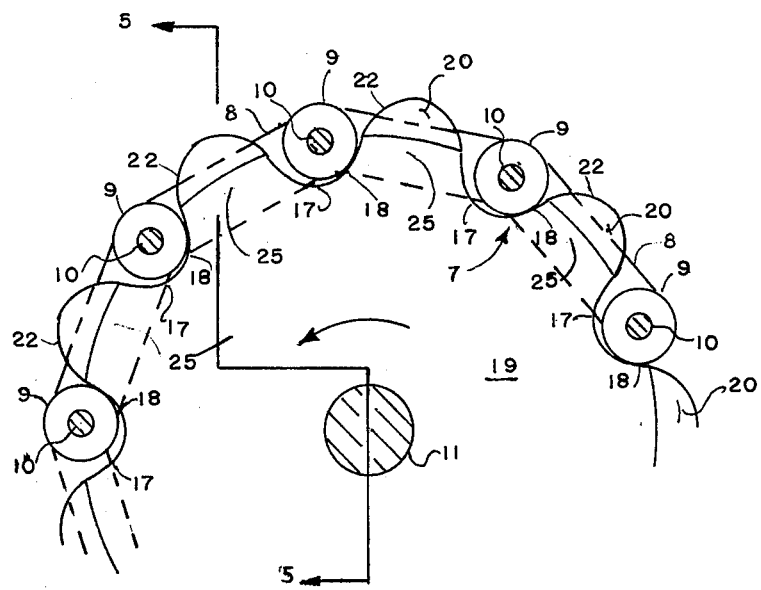
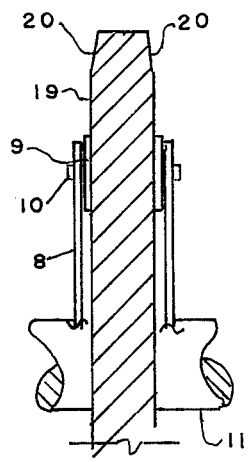
FIG. 4
FIG. 5
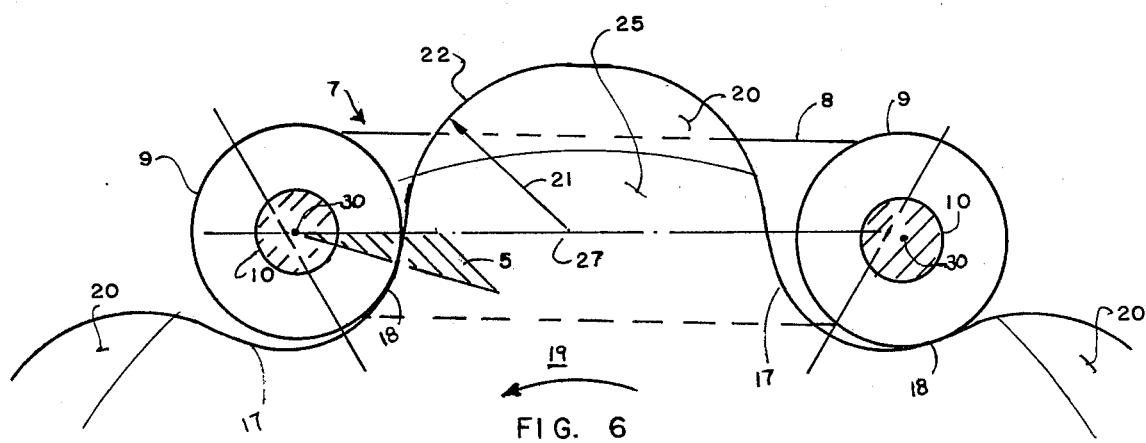
FIG. 6

SPROCKET AND METHOD FOR PRODUCING SAME

BACKGROUND OF THE INVENTION

1. FIELD OF THE INVENTION

This invention relates to chain drive and power transmission systems and more particularly, to a new and improved sprocket for driving chains, and a method for producing the sprocket, which sprocket is characterized by a tooth profile having clearance and loading curves tailored to a selected chain barrel diameter, a selected pressure angle and flared sides with a selected topping curve radius. The sprocket is designed to receive the barrels or drums of a chain and to accept the driving load in a fashion that prolongs service life by minimizing contact stresses while at the same time maintaining acceptable chain release characteristics.

An active chain and power transmission system is intended to carry a load, producing full chain tension along the active chain strand, and to be driven about a revolving sprocket where the load decreases in steps to that of the return or catenary strand. A cooperating sprocket then produces a stepped-up tension on the chain to produce a characteristic loading and unloading of the working chain. It is the smooth acceptance and release of the chain from the sprocket and the incremental change of load on the engaged sprocket teeth which are of paramount interest in sprocket design.

Chain barrel to sprocket tooth interface loads decrease incrementally around the drive sprocket from a maximum load on the sprocket tooth which initially engages the chain to a minimum on the sprocket tooth located at the balance point between the driving strand and slack strand tension. The major driving load typically occurs in a time interval of about 100 milliseconds when this type of power transmission system operates at normal speeds, producing a load similar to a heavy hammer blow against the face of the sprocket tooth which first engages the chain in a given interval of time. These repeated shocks result in rapid wear of the sprocket teeth.

The shock load is applied at the interface of the chain barrel and straight side of the sprocket tooth in a conventional trapezoidal sprocket system. Accordingly, the barrel-tooth contact can be considered for design calculation purposes to be a cylinder working on a plane. Contact stresses on such sprockets are quite high, and frequently result in permanent deformation of the sprocket teeth and shortened service life. Such stresses are also increased by failure of the chain barrels and sprocket teeth to make uniform contact during engagement.

Great care is generally exercised by all users in the selection of engineering and mill class chains for power transmission systems, and chain load ratings published by chain and sprocket manufacturers are usually conservatively stated in order to insure long chain life. Furthermore, several construction options, all of which are designed to improve service life, are generally offered to insure that the user selects a chain which will be used in a service which is well within the chain load capacity. Such options generally include a choice of hardened pins and bushings, and either carbon steel or a special alloy steel can be specified as a desired material of construction. These offerings generally permit the selection of a chain that will afford the user extended service life and an excellent return on the chain investment.

In contrast, sprockets have received much less attention than the chain systems with regard to design and care in specification. It is generally accepted in the industry that sprockets will wear to a certain degree after a relatively short service life and will in the normal course of events require replacement or extensive reworking prior to being placed back into service. The sprockets most frequently develop a cavity, and wear "hooked" due to attrition between the chain barrel or drum and the sprocket teeth, generally because of high magnitude shock loading as the srocket teeth initially engage the active chain strand. This relatively rapid wear results in considerable down-time required to replace or modify the sprockets, and this, in combination with a steadily increasing labor cost factor, make such lost time a costly hindrance.

The typical mill chain sprocket currently in use is constructed by means of either a sand casting or it is flame cut from carbon steel. Such sprockets are intended for use with a large variety of chains having identical pitch but not necessarily the same barrel or roller diameter. An advantage is realized in this type of construction because the sprockets so constructed are relatively inexpensive, and the stocking distributor and user are therefore able to stock a reduced inventory; accordingly, the replacement cost of such sprockets is relatively low and the availability is high.

DESCRIPTION OF THE PRIOR ART

Techniques which are commonly used to extend the service life of conventional flame cut or sand cast sprockets are as follows. First, use of a sprocket having an odd number of teeth which gives a "hunting tooth" drive operation presenting a different set of teeth to the chain in each sprocket revolution sometimes aids in minimizing sprocket tooth contact and wear. Secondly, use of flanges mounted at the sides of the sprockets and designed to accommodate chain side bars and attachments which take a part of the load off of the sprocket to chain barrel contact point are many times used. Finally, it is sometimes desirable to use a large number of teeth on the sprocket in order to increase the pressure angle, thereby lowering the unit load per tooth and reducing wear.

As heretofore noted, general wear patterns for sprockets show that the teeth tend to wear "hooked-shaped" to the point where they are so badly undercut that they will no longer release a chain. Such wear, which may be the result of extremely high contact stresses, frequently causes the teeth of overloaded cast iron sprockets to crack and break. As heretofore discussed, application of high magnitude shock loads as the sprocket teeth initially engage the active chain strand aggravates this condition, the result of which is the formation of a large, progressive pit, which is ultimately manifested as a hooked tooth, or teeth, and causes the sprocket to be ultimately unfit for use.

Accordingly, it is an object of this invention to provide new and improved sprockets for use in power transmission systems, and a method for producing these sprockets which sprockets are characterized by a tooth profile having clearance and loading curves tailored to a specific chain barrel diameter, a specified pressure angle, flared sides and a selected topping curve radius.

Another object of the invention is to provide new and improved sprockets for engaging and driving chains in power transmission systems which are designed to receive and seat the barrel or roller of a specified chain with minimum wear resulting from reduced load distribution per tooth.

Yet another object of the invention is to provide a new and improved technique for designing sprocket templates to create new and improved drive sprockets for use in chain drive systems, which templates and resulting sprockets are designed to minimize sprocket wear resulting from contact between the chain barrels or rollers and the sprocket teeth.

A still further object of the invention is to provide a method of creating sprocket templates for producing new and improved sprockets for driving chains in power transmission systems which templates and sprockets are characterized by a loading curve approaching the diameter of the roller or drum of a particular chain to be driven, and an optimum pressure angle and topping curve radius.

Another object of the invention is to provide new and improved sprocket templates for creating sprockets useful in chain drive systems, which templates and sprockets are designed with curved teeth and fillets to aid in maintaining an accurate chain pitch in seating the chain barrels.

BRIEF DESCRIPTION OF THE DRAWINGS

The invention will be better understood in view of the following description presented with reference to the accompanying drawings.

FIG. 1 is a side elevation of a pair of conventional trapezoidal tooth sprockets connected by a typical chain having one set of link plates removed, which chain is loaded on the sprockets in conventional fashion.

FIG. 2 is a front elevation of the sprockets and connecting chain illustrated in FIG. 1, with both sets of link plates in place;

FIG. 3 is a side elevation, partially in section, of a conventional sprocket loaded with a typical chain having the link plates in each link removed, and illustrating typical forces imposed on the chain and sprocket during operation;

FIG. 4 is a side elevation, partially in section, of a sprocket of this invention, with a typical chain having one of the link plates in each link removed, which chain is loaded on the sprocket;

FIG. 5 is a front elevation, partially in section, of the sprocket illustrated in FIG. 4, with the section taken along lines 5-5 in FIG. 4;

FIG. 6 is a side elevation, partially in section. of a portion of the sprocket illustrated in FIG. 4, more particularly illustating the pressure angle and identifying the major components of the sprocket tooth geometry;

DESCRIPTION OF THE PREFERRED EMBODIMENTS

Figure 7:
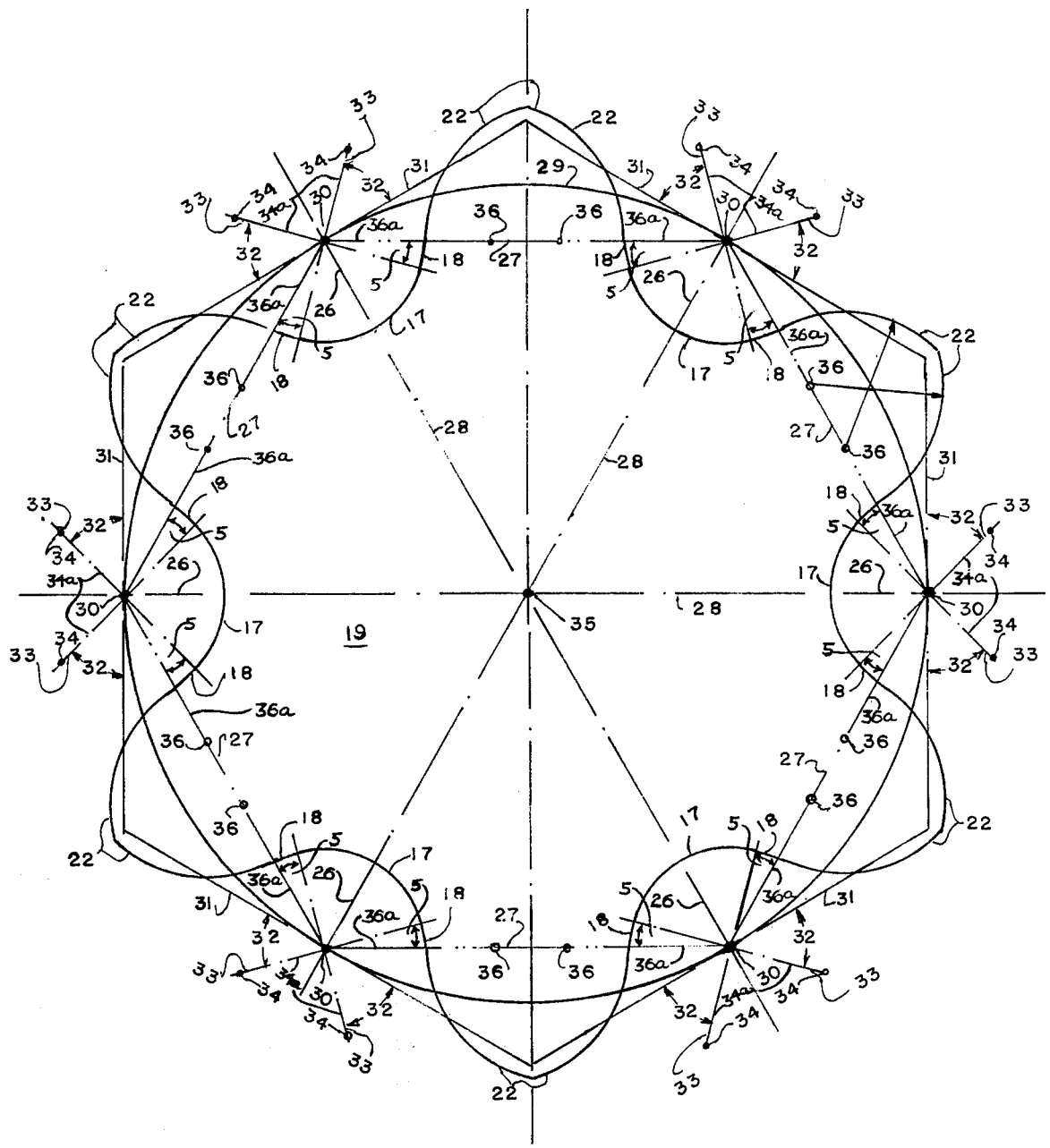
FIG. 7 is a side elevation of a sprocket template of the sprocket illustrated in FIGS. 4-6, more particularly showing development of the improved sprocket configuration.

Referring now to FIGS. 1 and 2 of the drawing, conventional drive sprocket 1 and conventional idler sprocket 2 are illustrated with conventional sprocket teeth 3, which are typically trapezoidal in shape. Conventional drive sprocket 1 is driven in the clockwise direction on drive sprocket shaft 11 as indicated by the arrow, while conventional idler sprocket 2 is driven in the same direction by operation of chain 7 on sprocket idler shaft 23. Chain 7 is loaded on conventional sprocket teeth 3 in typical loading configuration by means of chain barrels 9, chain barrel pins 10 and cooperating chain link plates 8, the front set of which are not illustrated in FIG. 1. Conventional drive sprocket 1 and conventional idler sprocket 2 are designed for versatility of use to accommodate a large variety of chains having the same pitch, or center-of-pin to center-of-pin dimension. Accordingly, when conventional drive sprocket 1 is turning in the clockwise direction as indicated by the arrow, this results in the full active chain tension being applied to one of conventional sprocket teeth 3 during an angle of revolution equal to one tooth interval, and taking place between the time the sprocket first engages the active strand of chain 7, and continuing until the succeeding one of conventional sprocket teeth 3 does likewise. Since this load is suddenly applied and is maintained over a relatively short time duration, it may be characterized as a shock load similar to a hammer blow. The application of this load to conventional tooth shoulders 12 of conventional sprocket teeth 3 by chain barrels 9 produces extremely high contact stresses which cause wear. Such high stresses are produced because of contact between a cylinder and a plane. Accordingly, the combination of uneven chain barrel loading and line contact between chain barrels 9 and conventional tooth shoulders 12 of those conventional sprocket teeth 3 which are loaded results in extremely high barrel-to-sprocket tooth pressures, and causes rapid wearing of conventional sprocket teeth 3. This wear is usually manifested in the form of a cavity 15, as illustrated in FIG. 1, and is characteristically referred to as wearing hooked shaped. This cavity 15 wears progressively larger and deeper until chain barrels 9 will not release from conventional sprocket teeth 3, and the sprocket must be replaced.

Referring now particularly to FIGS. 1 and 3 of the drawing, the development of a typical profile for conventional sprocket teeth 3 of conventional drive sprocket 1 is shown, with major force vectors 4 and 6 acting on conventional drive sprocket 1 engaged with a selected chain. FIG. 3 particularly illustrates the pressure angle 5, through which major force vectors 4 and 6 are transmitted to contact points 24 between chain barrels 9 and conventional tooth shoulders 12 of conventional drive sprocket 1. The chain load, or chain pull force, is felt along force vector 4, which is a series of lines connecting adjacent chain pin centers, or pitch points, 30. This force is felt at contact points 24 between the respective chain barrels 9 and conventional tooth shoulders 12, the pull force being transmitted through an angle having a vertex at the pitch points 30 of chain barrels 9, and vectors consisting of force vector 4 and force vector 6. The angle thus formed is designated as the pressure angle 5, and the magnitude of the force acting along force vector 6 is of a lessor magnitude than that of the chain pull force along force vector 4. The forces acting on pitch points 30 of chain barrels 9 are in equilibrium, the chain pull force along force vector 4 passed on to each succeeding pitch point being a constant, but small percentage of the total force applied at the pitch point of the preceding chain barrel 9. The pressure angle 5 is constant for all teeth in engagement, and the forces brought to bear on contact points 24 decrease on conventional sprocket teeth 3 as the sprocket rotates, until a point of equilibrium is reached in the system where the unloaded, or catenary chain strand tension equals the chain pull along force vector 4. This point is defined as the balance point.

Referring again to FIG. 3 of the drawing, development of a profile of conventional sprocket teeth 3 can be effected by forming a regular polygon by joining known chain pitch lengths and extending a force vector 6 through the junction of each set of chords of the polygon and rotated through a selected pressure angle 5. Chain barrels 9 are then drawn in position, and one of conventional tooth shoulders 12 is drawn normal to force vector 6 and tangent to chain barrel 9 at each of the contact points 24. A clearance 16 is then drawn to allow egress of foreign matter during operation of the chain, and fillets 14 are added to reduce stress concentration. Topping curve 13 is then drawn to assist in a smooth release of the chain from the sprocket. Conventional tooth shoulders 12 of the sprocket teeth are thus straight, and for stress analysis purposes, the system becomes a series of cylinders bearing against planes, with each one of contact points 24 being that of a cylinder in contact with a plane.

Referring now to FIGS. 4, 5 and 6 of the drawing, an improved sprocket 19 of this invention is illustrated, with improved sprocket teeth 25 and optional bevel 20. A conventional chain 7, equipped with chain link plates 8, which are joined to chain barrels 9 by means of chain barrel pins 10, is illustrated in loaded configuration on improved sprocket teeth 25, as improved sprocket 19 is driven in the indicated counterclockwise direction. As illustrated, improved sprocket 19 is characterized by an improved profile quite different in configuration from conventional drive sprocket 1. Improved sprocket 19 is characterized by loading curve 18, which is that area on each of improved sprocket teeth 25 which substantially matches the curvature of specified chain barrels 9 in a given chain 7, and bears the contact load while drastically decreasing contact stresses between chain barrels 9 and improved sprocket teeth 25. In addition to providing a calculated mating condition between chain barrels 9 and loading curve 18 of improved sprocket teeth 25 to enhance stress characteristics, the configuration of improved sprocket 19 also aids in maintaining an accurate chain pitch because of the superior barrel seating configuration. This characteristic of improved sprocket 19 insures contact, respectively, between essentially all of chain barrels 9 and improved sprocket teeth 25 on each respective loading curve 18. Wearing of the sprocket is therefore much reduced and the sprocket configuration results in longer sprocket life.

Referring now particularly to FIGS. 4 and 6, the improved configuration of each one of improved sprocket teeth 25 is characterized by a generous clearance curve 17, which joins loading curve 18, and by a topping curve 22 which extends loading curve 18. Dimensions for required angles and curves in the improved sprocket profile are derived from the particular chain pitch, barrel diameter, number of teeth on the sprocket, and other design information, as hereinafter set forth.

It will be appreciated by those skilled in the art that a key factor in providing a sprocket profile template according to the teaching of this invention which is compatible with a selected chain depends on matching a given sprocket to the particular chain selected. More particularly, referring again to FIG. 4 of the drawing, the improved sprocket 19 of this invention may be designed to drive a chain 7 having chain barrels 9 characterized by a particular dimension and pitch, with the sprocket having a specified number of teeth.

Accordingly, the sprocket design technique of this invention depends upon the development of a sprocket template which is drawn from catalog and known design data on a selected chain to be driven. Initially, both the chain pitch and chain barrel diameter are determined, and a maximum sprocket face width (thickness of the sprocket teeth at the pitch line) is selected which is compatible with the power transmission system to be used.

Referring now to FIG. 7 of the drawing, a particular sprocket template can be designed to produce a selected sprocket, from appropriate design computations, as follows:

| | | | |
|---|---|---|---|
| 1. | Pitch Diameter | 28: | Pitch Diameter = $\dfrac{\text{Chain Pitch}}{\sin \dfrac{180°}{\text{Teeth}}}$ |
| 2. | Clearance Curve Radius | 26: | Clearance Curve Radius = $\dfrac{\text{Catalog Chain Barrel Dia.} + .18}{2}$ |
| 3. | Topping Curve Center Points | 36: | Topping Curve Center point distance 36a = 1.2 (2 × Clearance Curve Radius) |
| 4. | Loading Curve Center Points | 34: | Loading Curve Center Point distance 34a = 0.9 (2 × Clearance Curve Radius) |
| 5. | Loading Curve Angles | 32: | Loading Curve Angle = 40° + 60°/Teeth |

Referring now to FIG. 7 of the drawing, a sprocket template for manufacture of a selected improved sprocket 19 is created as follows: Sprocket center 35 is first laid out and pitch circle 29 is drawn, using pitch diameter 28, calculated according to the formula set forth in item 1, above, where the term "teeth" refers to the number of teeth on the sprocket. A regular polygon with chordal lines 27 corresponding in length to the length of the selected chain pitch is then inscribed within pitch circle 29. Additional pitch diameter 28 lines are drawn through sprocket center 35 connecting pitch points 30, at the junction of chordal lines 27 and pitch circle 29. First reference lines 31 are then drawn through pitch points 30 perpendicular to pitch diameter 28 lines. Second reference lines 33 are subsequently drawn through pitch points 30 and rotated from first reference lines 31 through loading curve angles 32, calculated according to the formula in item 5, above. Loading curve center points 34 are located along second reference lines 33 at loading curve center point distances 34a from pitch points 30, which are calculated in accordance with the formula in item 4, above. Clearance curve radii 26, calculated in accordance with the formula in item 2 above, are drawn from each of the pitch points 30, and clearance curves 17 are inscribed as illustrated. Loading curves 18 are then inscribed from centers at loading curve center points 34, extending and flaring clearance curves 17. This produces the continuously curving tooth face and optimum pressure angle of the sprocket of this invention. Topping curve center point distances 36a, locating topping curve center points 36 of topping curves 22, are calculated according to the formula in item 3, above, and are located along chordal lines 27, with origins at pitch points 30. Topping curves 22 are then drawn extending loading curves 18, and either closing with the adjacent topping curves 22, as illustrated, or closing on an outside diameter circle in the case of chains having an extremely long pitch. This procedure creates a particular pressure angle 5 for each improved sprocket 19 created from selected chain criteria, as illustrated above.

The following examples show a typical set of stress calculations for conventional and improved sprocket configurations, and illustrate the advantages of the improved sprocket of this invention. Catalog information furnished in all examples is as follows:

| SPROCKET TYPE | PRESSURE ANGLE | BARREL DIAMETER | CATALOG LOAD |
|---|---|---|---|
| | | (Inches) | (Pounds) |
| Straight Side Tooth (Trapezoidal) | 13° | .875 | 3000 |
| Straight Side Tooth (Trapezoidal) | 23° | .875 | 3000 |
| Curved Tooth | 23° | .875 | 3000 |

All sprockets and chains used in the calculations are considered to be manufactured of carbon steel with a modulus of elasticity; ($E = 30 \times 10^6$ psi), and a sprocket face width of (1) inch.

The formula used in all calculations on straight side tooth (trapezoidal) sprockets is that for contact stresses derived from a cylinder bearing against a plane, and is found on P. 320, Formulas for Stress and Strain, 4th Ed., R. J. Roark. This formula is written as follows:

$$S_c = .591 \sqrt{\frac{PE}{D}}$$

Where $S_c$ is the stress on the sprocket in pounds per square inch; P is the load in pounds per linear inch applied along force vector 6 to conventional sprocket teeth 3 as illustrated in FIG. 3 of the drawing; E is $30 \times 10^6$ psi; D is the chain barrel diameter in inches; and .591 is a constant.

Figure 8:
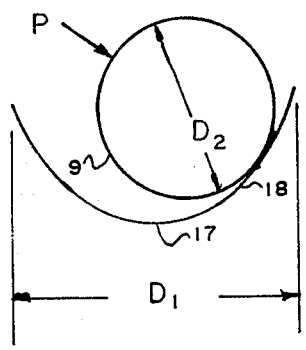
FIG. 8 is an illustration of the chain drum and loading curve cooperation which forms the basis for mathematical computation of contact stresses on the sprocket of this invention.

The formula for calculating contact stress of a cylinder working in a circular groove is also found in the R. J. Roark reference, and is applicable to calculating contact stresses of the improved sprocket of this invention. As illustrated in FIG. 8 of the drawing, P = the load in pounds per inch against loading curve 18 of improved sprocket teeth 25; $D_1$ = the diameter of the circular groove, which is the length of clearance curve, 17; and $D_2$ = the diameter of the cylinder, or the diameter of one of chain barrels 9. The stress is in pounds per square inch, and the formula is articulated as follows:

$$S_c = .591 \sqrt{PE \frac{D_1 - D_2}{D_1 \times D_2}}$$

Where 0.591 is a constant.

EXAMPLE I

The stress on a straight side (trapezoidal) sprocket tooth using a pressure angle of 13° and assuming a barrel diameter of 0.875 inches and a catalog load of 3000 pounds was computed as follows:

P = Catalog load × COS 13°
P = 3000 × 0.97437
P = 2923.11

$$S_c = .591 \sqrt{\frac{2923.11 \times 30 \times 10^6}{.875}}$$

$s_c = 187,096.93$ psi

EXAMPLE II

The stress on a straight side (trapezoidal) sprocket tooth using a pressure angle of 23° and assuming a barrel diameter of 0.875 inches and a catalog load of 3000 pounds was computed as follows:

P = Catalog load × COS 23°
P = 3000 × 0.92050
P = 2761.5

$$S_c = .591 \sqrt{\frac{2761.5 \times 30 \times 10^6}{.875}}$$

$s_c = 181,851.87$ psi

EXAMPLE III

The stress on a curved sprocket tooth using a pressure angle of 23° and assuming a barrel diameter of 0.875 inches and a catalog load of 3000 pounds was computed as follows:

P = Catalog Load × COS 23°
P = 3000 × 0.92050
P = 2761.5

$$S_c = .591 \sqrt{PE \frac{D_1 - D_2}{D_1 \times D_2}}$$

$D_1$ = Groove Dia. = 1.063
$D_2$ = Barrel Dia. = 0.875

$$\max s_c = .591 \sqrt{2761.5 \times 30 \times 10^6 \frac{1.063 - 0.875}{1.063 \times 0.875}}$$

max $s_c = 76,476.66$ psi

It is apparent from a consideration of the above calculations that the improved sprocket profile template of the instant invention enables production of a sprocket which lasts longer than conventional sprockets in the same load application situation. The reduced stress realized results in longer sprocket life with less down time and loss of production efficiency in power transmission systems. When such sprockets are placed in service driving chains for which they have been specifically designed, a much more reliable system is provided. This has been found to be particularly true when a sprocket material of construction which is compatible with a specific drive chain as to like moduli of elasticity and Poisson's ratio is chosen. The sprocket profile created from selected catalog information can, of course, be drawn on a suitable substrate such as paper and transferred to a template material, or in the alternative, it can be drawn directly on the template material itself.

Accordingly, having described my invention with the particularity set forth above, what is claimed is:

1. A method of producing a template profile for a sprocket comprising:
   a. selecting a sprocket face width, number of sprocket teeth, chain pitch and chain barrel diameter for a selected sprocket application;
   b. laying out the sprocket center;
   c. calculating a pitch diameter by dividing said chain pitch by the trigonometric function: sin (180° ÷ number of sprocket teeth selected);
   d. inscribing a pitch circle about said sprocket center using said pitch diameter;
   e. forming a regular polygon within said pitch circle, said polygon having chordal lines corresponding to the length of said chain pitch;
   f. laying out additional lines corresponding in length to said pitch diameter and running through said sprocket center connecting pitch points formed by coincidence of said chordal lines with the intersections of said chordal lines of said regular polygon;
   g. laying out first reference lines through said pitch points perpendicular to said additional lines connecting said pitch points and tangent to said pitch circle at said pitch points;
   h. calculation of a loading curve angle by adding: 40° + (60° ÷ said number of sprocket teeth selected);
   i. laying out second reference lines through said pitch points along said first reference lines and rotated from said first reference lines through said loading curve angle at said pitch points;
   j. establishing loading curve center point distances from said pitch points along said second reference lines by multiplying 0.9 × (said chain barrel diameter + 0.18);
   k. laying out loading curve center points by measuring said loading curve center point distance along said second reference lines from said pitch points;
   l. calculating clearance curve radii by adding 0.18 to said chain barrel diameter and dividing by 2;
   m. laying out clearance curves from said clearance curve radii by inscribing an arc from each of said pitch points through said additional lines corresponding to said pitch diameter to form the fillets of said template;
   n. laying out loading curves by inscribing an arc from each of said loading curve center points, continuing said clearance curves to form the tooth shoulders of said template;
   o. calculating topping curve center point distances by the formula: 1.2 × (2 × said clearance curve radius);
   p. locating topping curve center points by laying off said topping curve center point distances along said chordal lines from said pitch points; and
   q. laying out topping curves from said topping curve center points by extending said loading curves on each of said shoulders of said template until said topping curves meet.

2. The method of claim 1 wherein said profile is drawn on template material.

3. The method of claim 1 wherein said profile is drawn on a selected material and transferred to template material.

4. A sprocket tooth profile in a sprocket for use in power transmission systems comprising:
   a. a plurality of clearance curves forming the fillet of each pair of adjacent teeth in said tooth profile, said clearance curves being a function of a selected chain barrel diameter and chain pitch;
   b. a plurality of loading curves forming the shoulders of said tooth profile, said loading curves being a continuation of said clearance curves; and
   c. a plurality of topping curves forming the top of the teeth in said tooth profile, said topping curves being a function of said clearance curves and a continuation of said loading curves.

5. The sprocket of claim 4 wherein:
   a. said clearance curves are created by establishing clearance curve radii extending from each one of a plurality of chain pitch points a distance equal to a selected chain barrel diameter plus 0.18 divided by 2, and striking clearance curve arcs from said pitch points to form said fillet for each pair of said teeth;
   b. said loading curves are created by locating loading curve radii from established loading curve center points by multiplying said clearance curve radii by 1.8; and striking loading curve arcs from said loading curve center points extending said clearance curve arcs to form said shoulders of said tooth profile; and
   c. said topping curves are created by locating topping curve radii from established topping curve center points by multiplying 2.4 times said clearance curve radius and striking topping curve arcs from said topping curve center points extending said loading curve arcs to join said clearance curve arcs at the top of each of said teeth in said tooth profile.

* * * * *